United States Patent
Prasanna Kumar et al.

(10) Patent No.: US 9,934,001 B2
(45) Date of Patent: Apr. 3, 2018

(54) SIMPLIFIED CREATION OF AN APPLICATION IN A SELECTED STREAM PROCESSING PLATFORM

(71) Applicant: Telefonaktiebolaget LM Ericsson (publ), Stockholm (SE)

(72) Inventors: Manoj Prasanna Kumar, Chennai (IN); Karthikeyan Premkumar, Chennai (IN); Senthamiz Selvi Arumugam, Chennai (IN); Subramanian Shivashankar, Chennai (IN); Saradindu Kar, Bhubaneswar (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 30 days.

(21) Appl. No.: 15/023,641

(22) PCT Filed: Sep. 24, 2013

(86) PCT No.: PCT/SE2013/051107
§ 371 (c)(1),
(2) Date: Mar. 21, 2016

(87) PCT Pub. No.: WO2015/047140
PCT Pub. Date: Apr. 2, 2015

(65) Prior Publication Data
US 2016/0210123 A1 Jul. 21, 2016

(51) Int. Cl.
*G06F 9/44* (2006.01)
*G06F 9/50* (2006.01)

(52) U.S. Cl.
CPC ............ *G06F 8/20* (2013.01); *G06F 8/36* (2013.01); *G06F 9/5027* (2013.01);
(Continued)

(58) Field of Classification Search
CPC ..... G06F 8/20; G06F 8/30; G06F 8/34; G06F 8/38; G06F 11/32
See application file for complete search history.

(56) References Cited

U.S. PATENT DOCUMENTS

| | | | |
|---|---|---|---|
| 7,899,861 B2 * | 3/2011 | Feblowitz | G06F 8/34 709/201 |
| 8,806,430 B1 * | 8/2014 | Bienkowski | G06F 8/34 717/110 |

(Continued)

OTHER PUBLICATIONS

K. Vidyasankar, "Batch Composite Transactions in Stream Processing", Springer-Verlag, Oct. 2017, LNCS 10630, pp. 13-32; <https://link.springer.com/chapter/10.1007/978-3-662-55947-5_2.>.*

(Continued)

*Primary Examiner* — Thuy Dao
*Assistant Examiner* — Ben C Wang
(74) *Attorney, Agent, or Firm* — Sage Patent Group

(57) ABSTRACT

A stream processing handling arrangement provides a number of data handling blocks, selectable for forming a work flow. The blocks comprise data processing blocks. The arrangement receives selections of data handling blocks, block parameter settings and workflow property objectives, and compares the objectives with corresponding stream processing framework capabilities. The arrangement determines a stream processing framework for the work flow, provides a number software module groups, each corresponding to a different framework and comprising software modules corresponding to the data handling blocks, and chooses a group corresponding to the determined stream processing framework. The arrangement selects, in this group, software modules corresponding to the selected blocks and constructs an application using the selected software modules.

21 Claims, 6 Drawing Sheets

(52) U.S. Cl.
CPC .............. *G06F 9/5038* (2013.01); *G06F 8/30* (2013.01); *G06F 8/34* (2013.01); *G06F 8/38* (2013.01)

(56) References Cited

U.S. PATENT DOCUMENTS

| | | | | |
|---|---|---|---|---|
| 8,949,140 | B2* | 2/2015 | Liu | G06F 8/30 |
| | | | | 705/348 |
| 9,182,949 | B2* | 11/2015 | Eksten | G06F 9/5072 |
| 9,286,032 | B2* | 3/2016 | Feblowitz | G06F 8/20 |
| 9,329,975 | B2* | 5/2016 | Park | G06F 11/3636 |
| 9,639,589 | B1* | 5/2017 | Theimer | G06F 17/30575 |
| 2008/0133209 | A1* | 6/2008 | Bar-Or | G06F 8/34 |
| | | | | 703/21 |
| 2009/0100407 | A1* | 4/2009 | Bouillet | G06F 8/34 |
| | | | | 717/105 |
| 2009/0265718 | A1* | 10/2009 | Liu | G06F 8/30 |
| | | | | 719/318 |
| 2010/0293533 | A1* | 11/2010 | Andrade | G06F 8/10 |
| | | | | 717/140 |
| 2011/0103766 | A1* | 5/2011 | Priddle | H04N 21/4307 |
| | | | | 386/241 |
| 2011/0185339 | A1* | 7/2011 | Andrade | G06F 8/20 |
| | | | | 717/104 |
| 2012/0311562 | A1* | 12/2012 | Wang | H04L 67/22 |
| | | | | 717/177 |
| 2013/0014088 | A1* | 1/2013 | Park | G06F 11/3636 |
| | | | | 717/128 |
| 2013/0067476 | A1* | 3/2013 | Rosenberg | G06F 9/4843 |
| | | | | 718/100 |
| 2014/0282359 | A1* | 9/2014 | Feblowitz | G06F 8/20 |
| | | | | 717/104 |
| 2014/0282402 | A1* | 9/2014 | Eksten | G06F 9/5072 |
| | | | | 717/123 |
| 2014/0358926 | A1* | 12/2014 | McGregor | G06F 19/322 |
| | | | | 707/737 |
| 2015/0135255 | A1* | 5/2015 | Theimer | H04L 63/20 |
| | | | | 726/1 |
| 2016/0019032 | A1* | 1/2016 | Ritter | G06F 8/313 |
| | | | | 717/114 |
| 2017/0142140 | A1* | 5/2017 | Muddu | H04L 63/1425 |

OTHER PUBLICATIONS

Chiou et al., "Nova—Continuous Pig/Hadoop Workflows", ACM, Jun. 2011, pp. 1081-1090; <https://dl.acm.org/citation.cfm?id=1989439&CFID=1010142667&CFTOKEN=63671704>.*

Chaturvedi et al., "Collaborative Reuse of Streaming Dataflows in IoT Applications", IEEE, Oct. 2017, pp. 403-412; <http://ieeexplore.ieee.org/stamp/stamp.jsp?tp=&arnumber=8109159>.*

International Search Report, Application No. PCT/SE2013/051107, May 9, 2014.

Written Opinion of the International Searching Authority, Application No. PCT/SE2013/051107, dated May 9, 2014.

Berbner et al., "An approach for the Management of Service-oriented Architecture (SoA) based Application Systems", *Enterprise Modelling and Information Systems Architectures (EMISA 2005)*, Klagenfurt, Austria, Oct. 24-25, 2005, 14 pp.

Chudasma et al., "Service Composition using Service Selection with WS-Agreement", *Compute '09—Proceedings of the 2nd Bangalore Annual Compute Conference*, Jan. 9-10, 2009, 5 pp.

Neumeyer et al., "S4: Distributed Stream Computing Platform", *2010 IEEE International Conference on Data Mining Workshops (ICDMW)*, Sydney, NSW, Dec. 13, 2010, pp. 170-177.

Niemöller et al., "Towards a Service Composition Language for Heterogeneous Service Environments", *2011 15th International Conference on Intelligence in Next Generation Networks*, Berlin, DE, Oct. 4-7, 2011, pp. 121-126.

* cited by examiner

SIMPLIFIED CREATION OF AN APPLICATION IN A SELECTED STREAM PROCESSING PLATFORM

CROSS REFERENCE TO RELATED APPLICATION

This application is a 35 U.S.C. § 371 national stage application of PCT International Application No. PCT/SE2013/051107, filed on Sep. 24, 2013, the disclosure and content of which is incorporated by reference herein in its entirety. The above-referenced PCT International Application was published in the English language as International Publication No. WO 2015/047140 A1 on Apr. 2, 2015.

TECHNICAL FIELD

The invention relates to data stream mining. More particularly, the invention relates to a stream processing handling as well as to a method, computer program and computer program product for allowing a user to obtain an application performing activities of a user selected work flow in a stream processing framework.

BACKGROUND

Data Stream Mining, i.e. the process of extracting knowledge structures from continuous, rapid data records, is becoming increasingly interesting to use in various environments, such as for instance in mobile communication systems.

There are multiple frameworks available for performing data stream mining, where S4, Storm and Spark are just a few. S4 is for instance described by Leonardo Neumeyer et al in "S4 : Distributed Stream Computing Platform", 2010 IEEE International Conference on Data Mining Workshops.

However, all these frame works or platforms have their own Application Programming Interface (API) and programming style and therefore behave differently from each other.

A user wanting to implement an application based on a stream processing frame work that best suits his need will then have to investigate the capability of the framework him- or herself in order to determine which is most suitable and then learn the API of the chosen framework. This is both time consuming and requires considerable skills by the user.

It would therefore be of interest to simplify for a user in the selecting of an appropriate stream processing framework and implementing an application using the selected stream processing framework.

SUMMARY

One object of the invention is thus to simplify for a user in the selecting of a stream processing framework and implementing an application based on the selected stream processing framework.

This object is according to a first aspect of the invention achieved by a stream processing handling-arrangement comprising a processor and memory. The memory contains computer instructions executable by the processor. Through these instructions the stream processing handling arrangement is operative to provide a number of data handling blocks, which data handling blocks are selectable by a user for forming a work flow and comprise data processing blocks that represent data processing functions to be included in the work flow, receive, from the user, selections of data handling blocks comprising data processing blocks, parameter settings of data processing blocks and workflow property objectives, compare the workflow property objectives with corresponding stream processing framework capabilities, determine a stream processing framework for the work flow based on the comparison, provide a number software module groups, where each software module group corresponds to a different stream processing framework and comprises software modules corresponding to the selectable data handling blocks, choose a software module group corresponding to the determined stream processing framework, select, in the chosen software module group, software modules corresponding to the user selected data handling blocks, and construct an application performing the activities of the work flow in the determined stream processing framework using the selected software modules.

This object is according to a second aspect also achieved by a method for allowing a user to obtain an application performing activities of a user selected work flow in a stream processing framework. The method is performed in a stream processing handling arrangement and comprises: providing a number of data handling blocks, which data handling blocks are selectable by the user for forming a work flow and comprise data processing blocks representing data processing functions to be included in the work flow, receiving, from the user, selections of data handling blocks comprising data processing blocks, parameter settings of data processing blocks, and workflow property objectives, comparing the workflow property objectives with corresponding stream processing framework capabilities, determining a stream processing framework for the work flow based on the comparison, providing a number software module groups, where each software module group corresponds to a different stream processing framework and comprises software modules corresponding to the selectable data handling blocks, choosing a software module group corresponding to the determined stream processing framework, selecting, in the chosen software module group, software modules corresponding to the user selected data handling blocks, and constructing an application performing the activities of the work flow in the determined stream processing framework using the selected software module.

The object is according to a third aspect achieved through a computer program for allowing a user to obtain an application performing activities of a user selected work flow in a stream processing framework. The computer program comprises computer program code which when run in a stream processing handling arrangement, causes the stream processing handling arrangement to:

provide a number of data handling blocks, which data handling blocks are selectable by a user for forming a work flow and comprise data processing blocks representing data processing functions to be included in the work flow, receive, from the user, selections of data handling blocks comprising data processing blocks, parameter settings of data processing blocks and workflow property objectives, compare the workflow property objectives with corresponding stream processing framework capabilities, determine a stream processing framework for the work flow based on the comparison, provide a number software module groups, where each software module group corresponds to a different stream processing framework and comprises software modules corresponding to the selectable data handling blocks, choose a software module group corresponding to the determined stream processing framework, select, in the chosen software module group, software modules corresponding to the user selected data handling blocks, and construct an application performing the activities of the work flow in the selected stream processing framework using the selected software modules.

The object is according to a fourth aspect furthermore achieved by a computer program product for allowing a user to obtain an application performing activities of a user selected work flow in a stream processing framework, which computer program product is provided on a data carrier and comprises said computer program code according to the third aspect.

The invention according to the above-mentioned aspects has a number of advantages. It simplifies for a user to implement a use case in a stream processing framework. The user does not have to investigate the capability of the framework him- or herself in order to determine ort study the peculiarities of the API of the framework. He or she only has to focus on the type of processing needed and the implementation will be made automatically in a suitable framework.

In an advantageous variation of the first aspect, the stream processing handling arrangement is further operative to receive a user selection of an order of the data handling blocks and connect the software modules in the selected order in the application.

In a corresponding variation of the second aspect, the method further comprises receiving a user selection of an order of the data handling blocks and connecting the software modules in the selected order in the application.

The data processing blocks may comprise complex event processing blocks. They may also comprise machine learning blocks. The data handling blocks may further comprise at least one visualization block for which the user may set a location where a visualization of the processing of the workflow may be presented. The data handling blocks may also comprise an input block for which the user may set a location from where input data to the workflow is to be obtained.

According to a further variation of the first aspect, the stream processing handling arrangement is further operative to provide data about the selected stream processing framework and the user selected data handling blocks and settings in a machine readable file, extract the data from the machine readable file in order to choose software module group, select software modules corresponding to the user selected data handling blocks and construct the application.

According to a corresponding variation of the second aspect, the method further comprises providing data about the selected stream processing framework, the user selected data handling blocks and their settings in a machine readable file and extracting the data from the machine readable file in order to choose software module group, select software modules corresponding to the user selected data handling blocks and construct the application.

The workflow property objectives may be related to the prioritising between workflow properties and a stream processing framework capability may be a measure of the ability of a stream processing framework to handle a corresponding property. A property may furthermore be a property in the group of message loss, delay within the work flow and latency.

Input data for the application may comprises physical property data of a node in a mobile network and output data from the application may comprise alarms generated based on the input data.

One software module being used in the construction of the application may be a software module having no correspondence in the data handling blocks. This module may be a processing location specifying software module. It may thus be a software module that points at a location where the processing of the application according to the selected processing framework is to be performed. This type of software module may furthermore be mandatory and not selectable. It may thus be required in every formed application. The application may therefore be constructed also using a software module specifying a location where the processing of the application is to be performed according to the selected processing framework. The application may also be compiled at this location.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

It has recently become of interest to be able to provide data stream mining applications in various environments, such as in mobile communication environments. There are multiple frameworks available for performing data stream mining, where S4, Storm and Spark are just a few. S4 is for instance described by Leonardo Neumeyer et al in "S4: Distributed Stream Computing Platform", 2010 IEEE International Conference on Data Mining Workshops.

However, all these frameworks or platforms have their own Application Programming Interface (API) and programming style and therefore behave differently from each other.

A user wanting to implement an application according to a use case that he or she is interested in based on a stream processing framework that best suits his need will then have to investigate the capability of the framework him- or herself in order to determine which is most suitable and then learn the API of the chosen framework. This is both time consuming as well as requires considerable skills by the user.

It would therefore be of interest to simplify for a user in the selecting of an appropriate framework and implementing an application using the selected framework.

In summary, there is thus no system to automate the process of deployment of use case workflows in stream processing frameworks like S4, Storm etc., there is no efficient workflow development environment for stream use cases, there is no system to suggest an appropriate stream processing framework to the user based on the use case/Service Level Agreement (SLA) of an application and there is no common visualization layer that supports all stream frameworks.

The present invention is directed towards improving on one or more of these issues.

Figure 1:
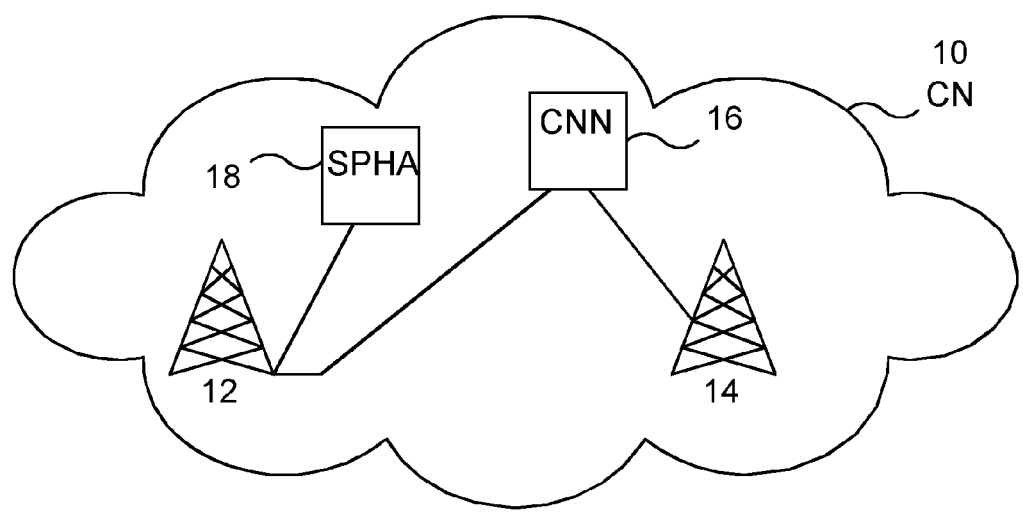
FIG. 1 schematically shows a mobile communication system in which a stream processing handling arrangement is provided, FIG. 2 schematically shows a first realization of the stream processing handling arrangement together with a user interface for allowing a user to access the stream processing handling arrangement.

The need for providing data stream handling applications may exist in a number of different systems. A data stream handling application may be considered to be an application that is based on or uses a data stream processing framework or platform. One system, in the form of a mobile communication system CS 10 is shown in FIG. 1. The exemplifying system is shown as comprising two base stations 12 and 14, in some systems denoted eNodeB, and a core network node CNN 16, which may be a node such as a Gateway GPRS support node (GGSN), where GPRS is an acronym for General Packet Radio Service. In the system there is also a stream processing handling arrangement SPHA 18. It should here be realized that the network is a simplified network and many more different nodes may be provided. The arrangement 18 is also disclosed as being a separate entity. It may however be combined with a node in the system such as the GGSN or some other node. The stream processing handling arrangement may in some cases also be viewed as a stream processing framework selection arrangement.

The arrangement 18 may thus be a part of a system, such as a mobile communication system, like Long Term Evolution (LTE) or Wideband Code Division Multiple Access (WCDMA). A mobile communication system may furthermore comprise a radio access network and a core network, where the core network may provide core network functionality such as keeping track of mobile terminals and their locations. The GGSN node is a core network node, while the base stations are access network nodes. The arrangement may as an example also be provided in other types of systems such as financial analysis systems or process control systems.

Figure 2:
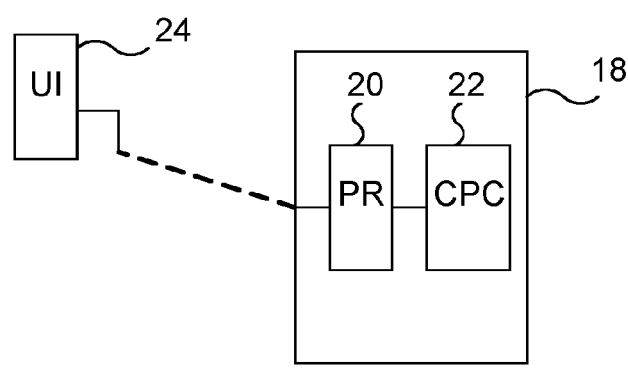

One variation of the stream processing handling arrangement 18 is shown in FIG. 2. According to the variation it is provided in the form of one or more processors with associated program memories comprising computer program code with computer program instructions executable by the processor for performing the functionality of the arrangement. In FIG. 2 one such processor PR 20 with associated computer program code CPC 22 is shown. In the figure there is also shown a user interface UI 24 connected to the processor 20. The user interface 24 may be a part of the arrangement. However it may just as well be a separate entity communicating with the arrangement via a computer communication network. The user interface 24 will be used by a user in order to obtain an application that is based on a stream processing framework such as S4.

Figure 3:
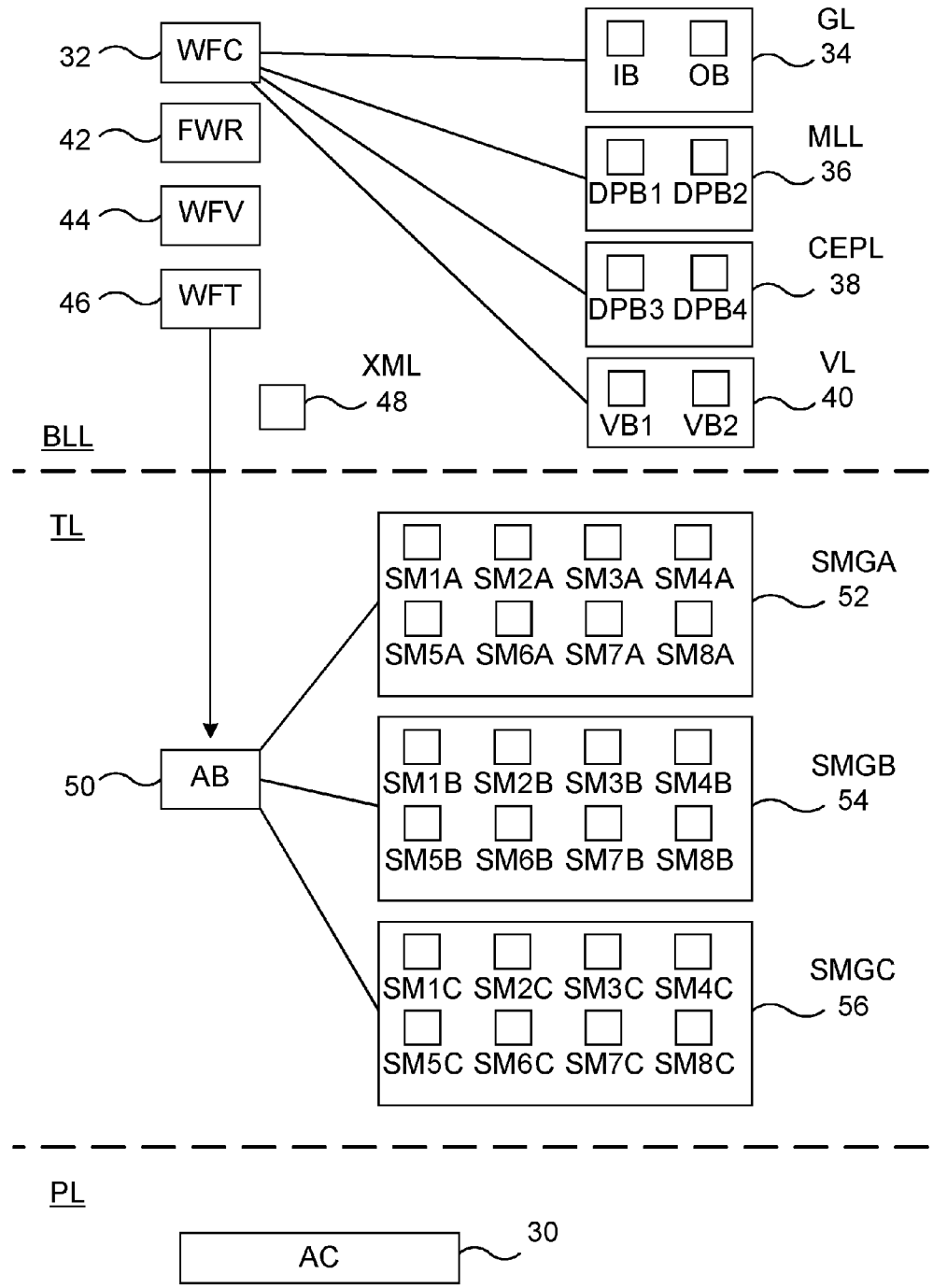
FIG. 3 shows a block schematic of a second realization of the stream processing handling arrangement being divided into a business logic layer, a transformation layer and a processing layer.

The functionality provided by the stream processing handling arrangement 18 is depicted in more detail in FIG. 3. The arrangement is in this variation divided into three different layers, a business logic layer BLL, a transformation layer TL and a processing layer PL.

In the Business Logic Layer BLL there is a Work Flow Creator WFC 32, which in turn is connected to a General Library GL 34, to a Machine Learning Library MLL 36, to a Complex Event Processing Library CEPL 38 and to a Visualization Library VL 40.

In these libraries there are a number data handling blocks, where the blocks in the Machine Learning Library 36 and Complex Event Processing Library 38 are data processing blocks. In the General Library 34 there is a an Input Block IB and an Output Block OB. In the Machine Learning Library 36 there is a first and a second data processing block DPB1 and DPB2. In the Complex Event Processing Library 38 there is a third and a fourth data processing block DPB3 and DPB4 and in the Visualization Library 40 there is a first and a second visualization block VB1 and VB2, In the Business Logic Layer there is also a Frame Work Recommender FWR 42, a Work Flow Viewer 44 and a Work Flow Transmitter 46.

In the Transformation layer TL there is an Application Builder 50, which is connected to a first software module group SMGA 52, to a second software module group SMGB 54 and to a third software module group SMGC 56. In the first software module group SMGA there is shown a first software module SM1A, a second software module SM2A, a third software module SM3A, a fourth software module SM4A, a fifth software module SM5A, a sixth software module SM6A, a seventh software module SM7A and an eighth software module SM8A. In the second software module group SMGB there is likewise a first software module SM1B, a second software module SM2B, a third software module SM3B, a fourth software module SM4B, a fifth software module SM5B, a sixth software module SM6B, a seventh software module SM7B and an eighth software module SM8B. Also in the third software module group SMGC there is a first software module SM1C, a second software module SM2C, a third software module SM3C, a fourth software module SM4C, a fifth software module SM5C, a sixth software module SM6C, a seventh software module SM7C and an eighth software module SM8C. The number of software modules in a group is just exemplifying. However, each corresponds to a data handling block in the Business Logic Layer. Furthermore, each group is provided for a data streaming frame work. The first group SMGA may thus be provided for the S4 frame work, the second group SMGB for the Storm frame work and the third group SMGC for the Spark frame work. This also means that every software module group may comprise one software module for each data handling block.

Naturally there may be more or fewer software module groups depending on how many data streaming frameworks are available to the user. There may for instance be four if also Massive Online Analysis (MOA) is available. However, there are at least two groups.

In the drawing it can also be seen that the Work Flow Transmitter 46 transmits a machine readable file, such as an eXtensive Markup Language (XML) file 48, to the application builder 50. This is a conventional way of transferring data. However, this also means that the Business Logic Layer and Transformation Layer may with advantage be provided in separate devices that communicate with each other.

Finally the Processing Layer PL comprises an application compiler AC 30. This may also be provided in a device that is separate from and communicates with the device comprising the application builder.

As mentioned earlier, the need for data stream mining is increasing. There are multiple frameworks (like S4, Storm etc.,) available for stream processing. However, there is no system that will suggest the best framework for the user, based on use case/service level agreement (SLA). Each of the above mentioned frameworks, have their own API and programming style. It is difficult for a user to learn each API and deploy use cases in each of the frameworks.

There is so far no system that will automate the process of deployment of use cases in frameworks and provide a common visualization layer across multiple stream processing frameworks.

If a stream based use case is to be deployed in any of the above mentioned frameworks, the user therefore needs to learn to install the framework and use the API of the framework to implement the use case. If visualization is required, the user may need to design custom web pages to view the results. The programming style and installation procedures will be different for each of the above mentioned stream processing frameworks. The user therefore needs to spend a lot of time in literature survey and experiments to choose the best framework for the use case.

There is therefore a need for simplifying for a user to implement a use case in a stream processing framework.

Variations of the invention address this problem. Some variations are therefore directed towards automating the process of development and deployment of use case workflows in stream processing frameworks like S4, Storm etc.

Other variations are directed towards suggesting an appropriate stream processing framework to the user based on the use case/SLA. Yet other aspects are involved with providing a common visualization layer that supports all stream frameworks.

Figure 4:
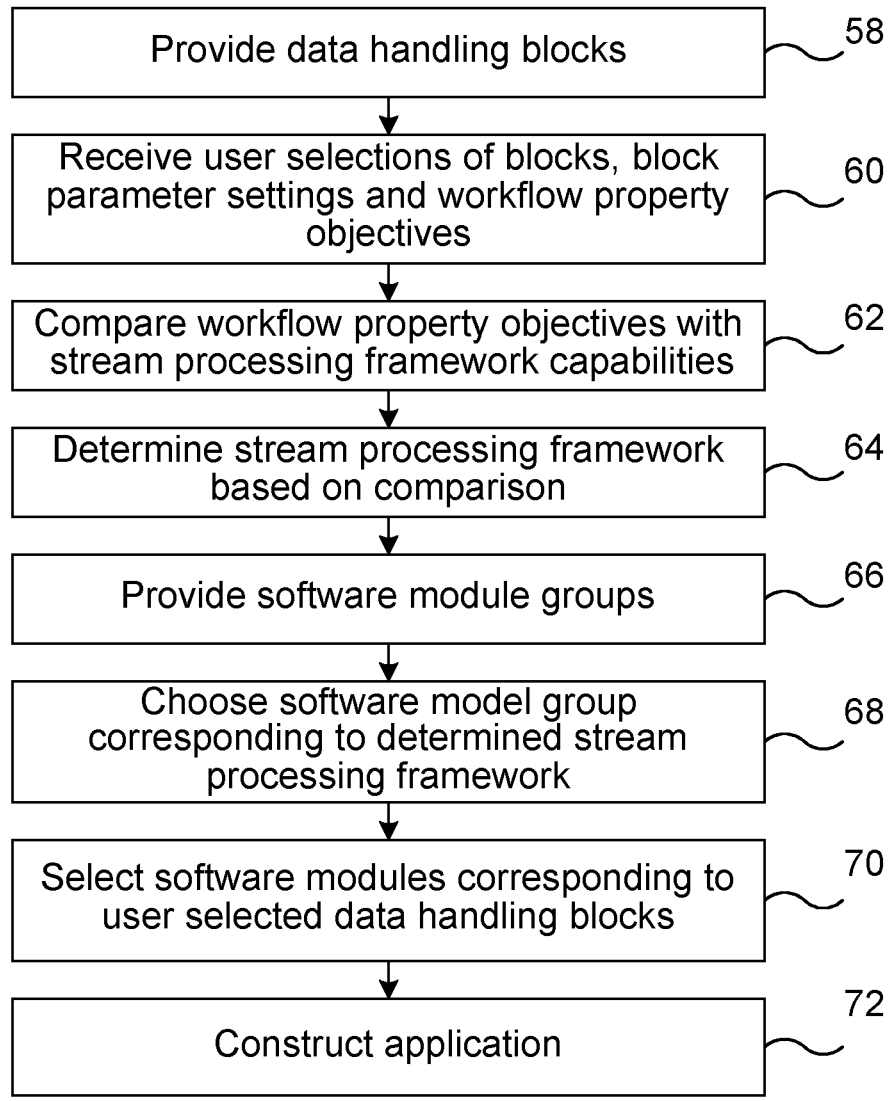
FIG. 4 shows a flow chart of a method for allowing a user to obtain an application performing activities of a user selected work flow in a stream processing framework according to a first embodiment.

A first embodiment will now be described with reference being made also to FIG. 4, which shows a flow chart of a method for allowing a user to obtain an application, which application is designed to perform activities of a user selected work flow in a stream processing framework.

The Business Logic Layer BLL provides data handling blocks, step 58, which blocks may be selected by the user, such as via the user interface 24, in order to form a work flow that provides an application. In order to enable this selection, the Business Logic Layer BLL provides the work flow creator 32, via which the user may select data handling blocks in the different libraries 34, 36, 38 and 40 and form a work flow according to a use case that he or she is interested in implementing as an application. In the selecting of blocks the user may also set various parameters of the blocks. The user may also set workflow property objectives. This means that the user may set properties that the work flow is to have, for instance regarding data throughput, such as delay through the work flow, amount of acceptable message loss or latency. The user may also provide inputs that provide a selection of an order in which the data handling blocks are to be provided.

The work flow creator 32 thereby receives user selections of data handling blocks, block parameter settings and workflow property objectives, step 60. The selections comprises a selection of data processing blocks, where a selected data processing block represents a data processing function to be included in the work flow. As the selected blocks comprise data processing blocks, the parameter settings also comprise parameter settings of these data processing blocks. In this way the work flow creator 32 enables the user to create workflows, for instance by allowing dragging and dropping of various available blocks and settings of parameters for these blocks. The blocks of a created work flow may then comprise an input block IB, which is connected to a data processing block. This may in turn be connected to a further data processing block and/or one or more visualization blocks in order to form a chain of data handling blocks. The last block of the work flow may then be an output block OB. The data processing blocks here typically represent a certain type of data processing, such as Machine Learning Functions, like Merge or CluStream, which is a clustering function. The processing may also be Complex Event Processing, such as Sort, Average Sum or Count. The Complex Event Processing may also comprise alarm generation.

It is possible that some selections are mandatory and that other are disallowed when the user uses the work flow creator. It is for instance possible that no data provision block is allowed to be selected until an input block is selected. It is also possible that one of the selected blocks has to be a data processing block and/or a visualization block. It is also possible that an output block has to be selected before a work flow is deemed to be completed and allowed to be used for forming an application.

The user may here also set out what input data and from what location input data is to be obtained in the input block IB and to what location output data is to be output by the output block OB, while a visualization block may receive a setting of at what location the visualization is to be performed. This may be done by the user setting appropriate Internet Protocol (IP) addresses and port numbers. The block itself may also represent a certain type of visualization, such as a bar graph. In a similar way a data processing block may represent a certain type of data processing. A visualization block may sometimes also form an output block.

The work flow creator 32 then forwards the workflow property objectives to the frame work recommender 42, which compares the work flow property objectives with stream processing frame work capabilities, step 62.

The workflow property objectives may be related to the priority between work flow properties, such as latency, delay or message loss, and corresponding stream processing framework capabilities, where a stream processing framework capability may the ability of the stream processing framework to handle a corresponding property. It is also possible that priorities are given to objectives.

The framework recommender 42 then determines or recommends a stream processing framework to be used for the work flow based on the comparison, step 64. This may involve determining a stream processing frame work that best matches the work follow property objectives. It is possible that a prioritising is made between different objectives.

It is here also possible that the user wants to watch the performance of the work flow in the different frameworks. The work flow visualizer 44, which may be a web based screen, may then display the results of the use case based on the visualization technique set out in the workflow. The work flow visualizer also enables users to compare the performance of the use case in various stream processing frameworks (like S4 and Storm). Here it is possible to use common performance metrics like Sum of Squared Distances (SSQ) and Cluster Mapping Measure (CMM) for this performance comparison.

After the frame work has been determined, the application builder 50 needs to be informed. This may be done through the application builder 50 obtaining data of the work flow directly from the work flow creator 32 and data about the determined frame work from the frame work recommender 42. The application builder 50 may for this reason communicate directly with these entities 32 and 42. As an alternative the same data may be transmitted to the application builder 50 in a machine readable file, such as the XML file 48 created by the work flow transmitter 46. It is thus possible that the work flow transmitter 46 receives the work flow selections from the work flow creator 32 and information of the determined work flow from the frame work recommender 42 and creates an XML file 48 comprising data about the workflow and determined frame work. This XML file may then be sent to the application builder 50 or the application builder 50 may fetch the XML file from the work flow transmitter 46.

The transformation layer TL provides the software module groups, step 66, where each group corresponds to a different stream processing framework. It thus provides the first, second and third software module groups SMGA, SMGB and SMGC, where there is thus one group for each framework and each group comprises software modules corresponding to the data handling blocks of the Business Logic Layer BLL. The application builder 50 in turn chooses a software module group corresponding to the determined stream processing framework, step 68. It thus chooses a software module group with software modules that are consistent with the stream processing framework determined by the frame work recommender 42.

The application builder 50 then selects software modules in the chosen software module group, where the modules that are selected correspond to the data handling blocks selected by the user when employing the work flow creator 32, step 70. This may also involve providing the modules in an order that is the same as the order in which the corresponding blocks appear in the created work flow. This will lead to the modules being connected to each other in the selected order in the application.

The selection may involve combining the modules in a way that is possible to compile by the application compiler 30 employing the selected framework. The combining may involve packing the selected software modules in a wrapper class, for instance a java class, dedicated to the framework for implementing the application. The creation of the application may thereby involve combining modules of high level code, such as java code, which code implements the user selected data handling block and is consistent with the determined stream processing framework.

The application builder 50 thus constructs the application that is to perform the activities of the work flow in the determined stream processing framework using the selected software modules, step 72. Thereafter the packed software modules are forwarded to the application compiler 30 which compiles the software code or scripts into low level code that executes the workflow code.

It can in this way be seen that an application may be created in a user friendly way based on a frame processing platform that best meets work flow objectives.

Figure 5:
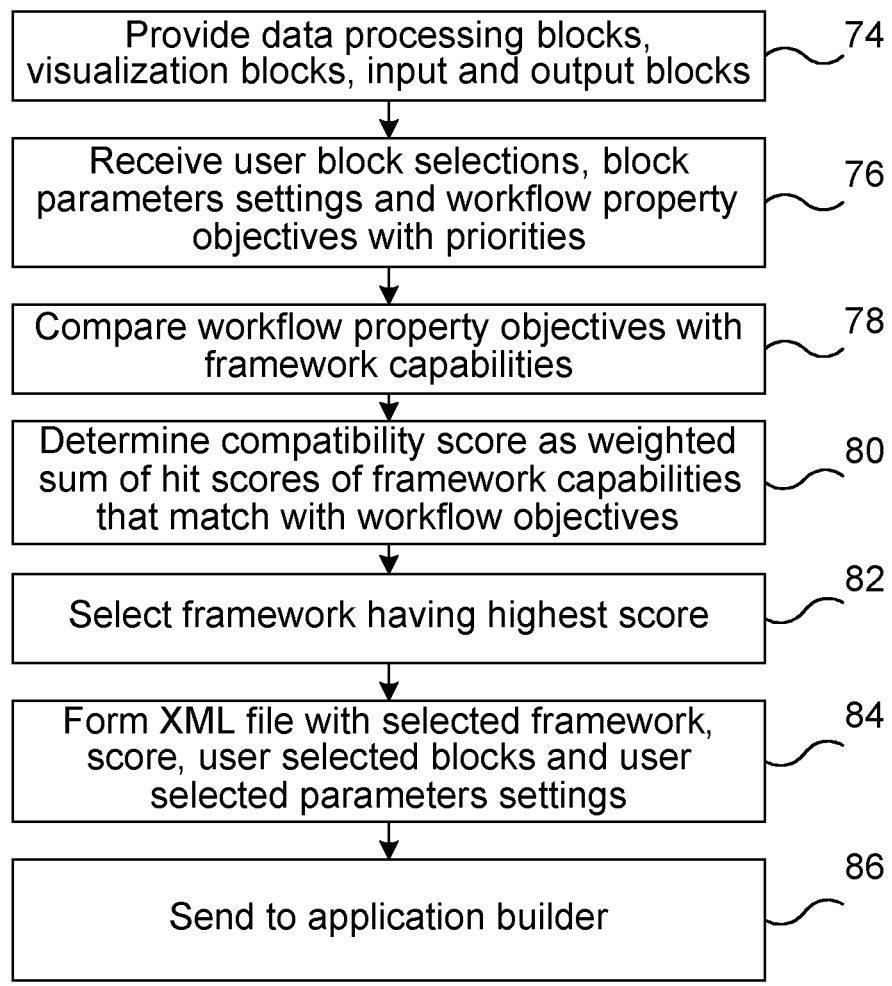
FIG. 5 shows a flow chart of a first part of a method for allowing a user to obtain an application performing activities of a user selected work flow in a stream processing framework according to a second embodiment.
Figure 6:
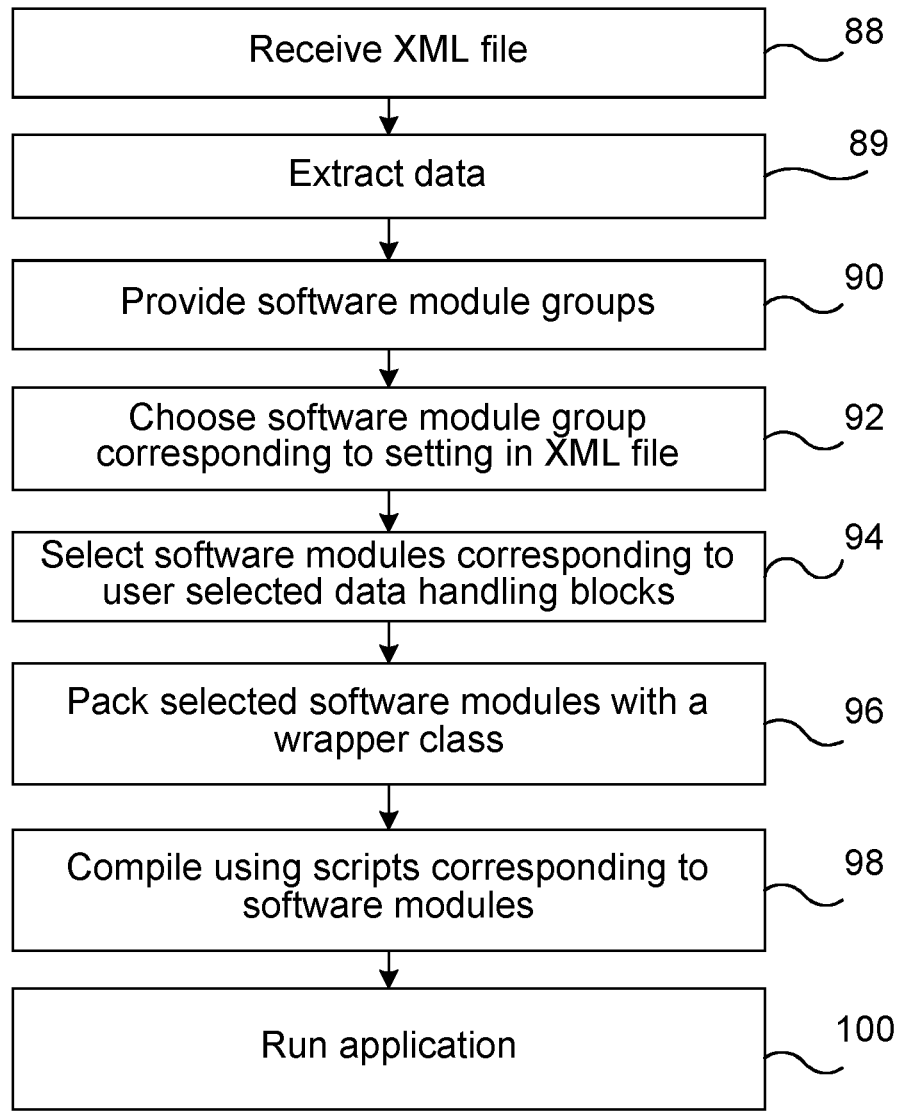
FIG. 6 shows a flow chart of a second part of the method for allowing a user to obtain an application performing activities of a user selected work flow in a stream processing framework according to the second embodiment.

A second embodiment will now be described with reference being made to FIGS. 5 and 6, which show a flow chart of a first part of a method for allowing a user to obtain an application performing activities of a user selected work flow in a stream processing framework and a flow chart of a second part of the method for allowing a user to obtain an application performing activities of a user selected work flow in a stream processing framework.

As in the first embodiment the Business Logic Layer BLL provides data handling blocks. More particularly it provides data processing blocks DPB1, DPB2, DPB3 and DPB4, visualization blocks VB1 and VB2 and input and output blocks IB and OB that may be selected by the user, step 74.

The input and output block IB and OB may more particularly be provided in the general library 34, the data processing blocks DPB1 and DPB2 in the Machine Learning Library 36, the data processing blocks DPB3 and DPB4 in the Complex Event Processing library 38 and the first and second visualization blocks VB1 and VB2 in the visualization library 40.

The user may then select blocks in these libraries via the work flow creator 32 and interconnect them for forming a work flow.

In order to allow this, the work flow creator 32 receives user block selections, block parameter settings and workflow property objectives as well as optional priorities of the work flow property objectives from the user, step 76. The work flow property objectives may furthermore be related to priorities between work flow properties such as delay, message loss or latency.

Figure 7:
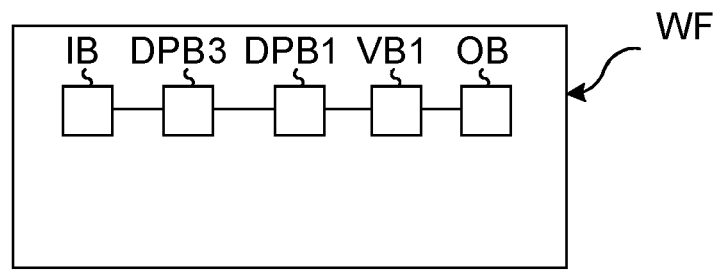
FIG. 7 shows a work space provided by the business logic layer of the stream processing arrangement and in which the user may form a work flow.

The workflow creator 32 may for this reason provide a drawing surface to which the user may drag and drop selected blocks and interconnect them with lines for forming a workflow. The same type of rules for selecting data handling blocks that were described for the first embodiment may also be used here in the second embodiment. FIG. 7 shows one such drawing area where the user has created an exemplifying workflow WF comprising the input block IB, which in turn is connected to the third data processing block DPB3, which third data processing block DPB3 is connected to the first data processing block DPB1, which in turn is connected to the first visualization block VB1. The first visualization block VB1 is finally connected to the output block OB. The user may thus create a chain of blocks that together define a desired functionality to be implemented in an application.

As an example the first data processing block DPB1 may be a block representing the function Clustream, the third data processing block DPB3 may be a block representing a sorting function and the first visualizing block VB1 may be a block representing the visualization of a bar chart.

As block parameter settings or parameter data the user may as an example set block parameter settings such as column name and key for the sorting function and number of clusters for the Clustream function. The user may furthermore define what input data is to be provided to the input block and from where it is to be obtained, such as an IP address and port number as well as the location to where output data from the output block OB of the work flow WF is to be provided. The user may also indicate a location where the visualization represented by the visualization block VB1 is to be provided, for instance as identified by an IP address and port number.

With regard to workflow property objectives and priorities, the user may define a value of the property, such as a logical value like true/false and allow/disallow, or a numerical value. In the case of a numerical value, a range may also be set within which the numerical value is to lie. The user may also give the property a priority. The work flow property objectives and priorities may be input by the user to the work flow creator 32, which then forwards them to the frame work recommender 42. As an alternative the frame work recommender 42 may receive this selection directly from the user.

For example, message loss, delay and latency may be some configurable properties of the workflow. The user may as an example be able to make the following settings of the properties.

| | |
|---|---|
| Message Loss | True/False |
| Delay | Low/Medium/High |
| Latency | Milliseconds/seconds/minutes |

Assume, according to the same example, that the user sets the properties below for the work flow WF in FIG. 7.

| | |
|---|---|
| Message Loss | True (Indicates message loss can be accepted) - Priority 1 |
| Delay | Low (Delay in processing of records should be very minimal) - Priority 2 |
| Latency | MilliSeconds - Priority 3 |

Assume that the weights of Priority 1, Priority 2, Priority 3 are 3, 2, 1 respectively.

The frame work recommender 42 then processes these inputs in the following way for the frameworks exemplified by S4 and Storm.

Based on expert inputs and trial experiments, the stream processing framework capabilities of S4 and Storm are assumed to be as shown in the table below.

| | Message Loss | Delay | Latency |
|---|---|---|---|
| S4 | True | Low | Seconds |
| Storm | False | Medium, High | Milliseconds |

The framework recommender 42 then determines or recommends a stream processing framework to be used based on a comparison of the workflow property objectives with priorities and the stream processing framework capabilities, where a stream processing framework capability may be a measure of the ability of the stream processing framework to handle a corresponding objective.

This may be done in the following way.

The framework recommender 42 first compares the workflow objectives with framework capabilities, step 78. This may be done through indicating that there is a hit for every capability that meets a corresponding workflow objective. A hit score for a particular workflow property objective may then be set to 1 if there is a hit and 0 if there is no hit.

Thereafter compatibility scores are determined as weighted sums of hit scores of framework capabilities that match with work flow objectives, step 80, where one such compatibility score may be determined for each framework. This means that the hits for a framework being investigated are weighted according to the priority given to the corresponding capability.

Using the table above, the compatibility scores for using S4 and Storm for the workflow mentioned in the above example may be calculated as follows.

$$\sum_{1}^{n} (HitScore * Weight_{Property})$$

The weight may be assigned according to the priority given to the property by the user. In the example given above priority 1 is given the weight 3, priority 2 is given the weight 2 and priority 3 is given the weight 1.

The compatibility score for using S4 for the above example may be calculated using this expression as follows.

For message loss, user has mentioned true. From the table, it is evident that S4 has message loss. So the hit score is 1. Similarly, for delay the hit score is 1 and for latency the hit score is 0.

Hence Score($S4$)=[(1*3)+(1*2)+(0*1)]

Score($S4$)=5

Similarly, calculating the value of Score(Storm). The hit score of message loss, delay and latency are 0, 0 and 1 respectively.

Hence Score(Storm)=[(0*3)+(0*2)+(1*1)]

Score(Storm)=1

The framework with a higher compatibility score is then selected by the frame work recommender 42, step 82. Hence, for this example, S4 is selected as the stream processing framework to be used for forming the application of the user.

If there is a tie in compatibility scores of both frameworks, the framework that suits the high priority properties of the workflow may be selected. It is to be noted that there may exist other ways of selecting the framework in case of tie.

In the example above only three properties of the workflow and two frameworks (S4 & Storm) were considered. Naturally it is possible to consider more properties and frameworks.

It is naturally also possible that the highest priority is given a lowest weight and that the framework having the lowest compatibility score is selected.

In the proposed method of recommending the suitable framework for the workflow, the function to compute hit score and weights for each property (given a priority) can furthermore be determined empirically. For instance, if a parameter takes real values, then the hit score can be computed as 1-euclidean distance.

It is also possible in this second embodiment that the user wants to watch the performance of the work flow in the different frameworks. The work flow visualizer 44, which also here may be a web based screen tool, then displays the results of the work flow WF or use case based on the visualization technique defined by the visualizing block in the workflow. The work flow visualizer 44 also enables users to compare the performance of the use case for instance in various stream processing frameworks (like S4 and Storm).

As described in the first embodiment, it is possible to use commonly used performance metrics like SSQ and CMM for this performance comparison.

After the frame work has been determined, the application builder 50 needs to be informed. This is in this second embodiment done through the work flow transmitter 46 receiving the work flow selections from the work flow creator 32 and information of the determined work flow as well as perhaps the score from the frame work recommender 42. The work flow transmitter 46 then creates a machine readable file, as an example in the form of an XML file 48, with this data. The work flow transmitter 46 thus forms an XML file 48 with data about the selected framework, the score, the user selected data handling blocks and user selected parameter settings of these user selected blocks, step 84. The XML file 48 is then sent to the application builder 50, step 86.

The application builder 50 of the transformation layer TL receives the XML file 48, step 88, extracts the data from the file 48, step 89. The transformation layer TL also provides the software module groups, step 90. The application builder 50 then chooses software module group corresponding to the setting in the XML file, step 92. It also selects software modules corresponding to user selected data handling blocks, step 94, and forms a high level grouping of selected software modules. This grouping of selected high-level software modules are then packed with a wrapper class, step 96.

This may be exemplified in the following way.

For example, assume the XML representation of the created workflow is as follows.

```
<workflow>
<framework>
    <name>S4</name>
    <score>5</score>
</framework>
<node>
    <name>Input data</name>
    <arguments>Location=10.184.17.11:8009 </arguments>
<node>
    <name>Sort </name>
    <arguments> Colname: key </arguments>
</node>
<node>
    <name> Clustream </name>
    <arguments> NumClusters:4 </arguments>
 </node>
<node>
<name> BarChart</name>
    <arguments> IP: 10.184.17.10:9002 </arguments>
</node>
</workflow>
```

In the example above, the user made no selections with regard to the output block OB. Furthermore, in the example above the output of the processing of the workflow is provided via the visualizing node, here named BarChart. Therefore there is no node is present in the XML file corresponding to the output block OB.

Just as in the first embodiment the application builder 50 has access to the first, second and third software module groups SMGA, SMGB and SMGC, each associated with a respective framework and comprising software modules corresponding to all the data handling blocks of the Business Logic Layer. The Transformation Layer thereby has a first, second and third library of the code of all the data processing and visualization blocks (CEP, ML and visualization) available in the workflow creator and perhaps also the general input and output blocks.

Based on the values of XML tags, corresponding code of the selected software modules is packed into an appropriate format as accepted by the selected stream processing framework.

It is evident from the XML example that the work flow should be deployed in S4. There are two components namely sort and clustream. Since, the selected framework is S4, the wrapper class may be a javaclass called "app", which may be created automatically. The "app" class has the logic of maintaining the order of the workflow and the details like IP, Port of S4 cluster.

"App" class will have the following logic, which logic comprises of processing elements (PE) as the framework is S4.

Data.read(inputData)
SortPE(inMap)
ClustreamPE(inMap)
S4 Cluster.setIP("10.184.17.11","8210");
Barchart(inMap)

The "data read" component has the function of reading the input data from the location specified by the node Input data in the XML file. It then stores this data in a hashmap denoted inMap.

It is to be noted that "inputData" is an object that contains the IP and port of the incoming data (obtained from XML of workflow), which may be an IP address and port number of a device, such as a database, a memory, register or computer from where the input data is to be read. By default, all components corresponding to data processing blocks are processing elements (PE) and take a Hashmap as an input. This Hashmap thus contains, the parameters required for the PE, data in key, value pairs and intermediate results (if any). There is a script at the background that executes the "app" in S4 . The script has the commands required to deploy the package consisting of "app", "SortPE" and "ClustreamPE" in the S4 installation in the IP specified in "app".

In the above example, inMap is passed as an argument to SortPE and then comprises the following values:

inMap.sortColumn=key
inMap.column_1=value
inMap.column_2=value

Note: Data loaded as key, value in inMap is obtained from the Data.read( ) component in app, which reads the data from the specified location. The parameters required for sortPE like column against which sorting should be performed, is thus obtained from the XML of the flow.

Likewise, parameters required for ClustreamPE is loaded into inMap (from the XML file) and the results from SortPE are also loaded into inMap before passing inMap to ClustreamPE. S4 takes care of passing inMap from SortPE to ClustreamPE, which may be done using a message bus like zeromq inherently by the framework.

The software modules of each software module group does in this embodiment as well as in some variations of the first embodiment comprise one software module that has no correspondence in the data handling blocks of the business logic layer BLL. In this example this is the software module S4 Cluster.setIP. This is a software module setting out where the processing of the application is to be performed. It thus specifies a location, such as via an IP address and port number of a device such as a server or computer, where the stream processing framework that the application is to use is provided. Naturally this processing location specifying software module points at different locations in the different software module groups. This type of software module may furthermore be mandatory and not selectable. It may thus be required in every formed application.

The BarChart(inMap) method constructs a bar chart (for visualization) of the results and displays it in for instance a HTML5 WebPage at the location specified by the corresponding node of the XML file. An IP address and port number may thus point at a device, such as a computer or database to where the results of the processing are to be provided.

If the selected framework is Storm, a java wrapper class called "topology" is created which is the storm equivalent of the "app" class of S4. Furthermore in the case of storm the software modules comprise bolts instead of processing elements. In other respects the same types of applications may be created using bolts instead of processing elements.

After the wrapper class has been created in this way, it is passed on to the application compiler 30, which compiles the high level software using scripts corresponding to the software modules, step 98. The compiler thus comprises the instances of various stream processing frameworks like S4, Storm and spark and has scripts comprising the commands to execute the workflow code package of the class created in the transformation layer for the workflow. Based on the framework, corresponding scripts are run, thereby automating the process of executing the workflow in the framework. The compiler for a specific framework is typically provided at the location specified by the corresponding location specifying software module. The compiler for S4 is thus provided at the location specified by the module S4 Cluster.setIP.

Thereafter the application is being run, step 100. The application, which is being run at the location specified by the software module S4 Cluster.setIP, fetches data from the location specified by the input data node of the XML file and then processes the data according to the data processing software modules SortPE and CluStreamPE. The results are then presented in the form and at the location specified by the Barchart node of the XML file. This latter location may furthermore be automatically updated with the results of the workflow at every configurable time window.

The work flow may be provided in a number of different environments.

In a first scenario a user may be interested in Real Time Monitoring.

Assume that a network site engineer wants to monitor various parameters of a site comprising one or more devices. The network site engineer may as an example want to monitor fuel level, fuel pressure, oil temperature and oil pressure at every instant. Whenever there is a drop in fuel level or oil pressure immediate action should be taken to safeguard the site. In such cases, the site engineer can just draw a work flow using the stream processing handling arrangement, which then implements an application corresponding to the work flow. Thereby the engineer may easily check if the parameters go beyond the thresholds at every instant real time. In case, the parameters go beyond the thresholds, he can configure alarms to be raised, so that immediate action is taken.

A similar situation may be obtained using the mobile communication system in FIG. 1, where the input data may comprise physical property data of a node, such as a temperature of the first base station, and the output data may comprises alarms generated based on this input data.

"The site engineer's work is thereby eased by abstracting the programming complexity, complexity in understanding the stream processing frameworks like S4/Storm.

He just creates a workflow for the task and the proposed system takes care of converting the workflow to running code and populating the results visually as different charts to the user.

In a second scenario the user may be interested in Real time reporting.

Assume, a business analyst is analyzing various data records and generating real time financial reports. If he is to identify potential places where a short duration dynamic discount campaign can be launched to boost the revenue, he can just create a workflow for this. Or if he needs to crunch data at real time for a new type of financial report or if he wants to change the method of representation of results at real time (for e.g., he might want to view the results of a particular portion of data as a pie chart) he can just create a workflow and the proposed system takes care of deployment and creating visual reports in the visualization module.

In a third scenario the user may be interested in Real time Analytics.

The important statistics like network load in a network such the mobile communication system, usage etc., on vital network elements can be monitored real-time by creating workflows as per requirements on the fly. This enables proactive identifying/correcting network congestions, proactively tuning the channel parameters like bandwidth by observing an increasing usage pattern at few recent instances etc. If a problem occurs in the network, Root cause analysis can be performed on the fly by analyzing data using different techniques by creating workflows on the fly.

Generally speaking the invention has a number of advantages.

The proposed arrangement is generic, enabling users to develop workflows for almost all kinds of stream use cases. The arrangement can be evolved over time through adding new functions (in ML, CEP and Visualization) as per the custom need. Cost in-terms of time to implement a specific application can be reduced totally. Overhead in installing and managing instances of various frameworks can be reduced. The proposed arrangement can be exposed as a service on demand. The proposed arrangement may be evolved through adding additional frameworks in the processing layer. The proposed arrangement also has a unified visualization layer that supports all frameworks in the processing layer.

The arrangement may, as was mentioned initially, be provided in the form one or more processors with associated program memories comprising computer program code with computer program instructions executable by the processor for performing the functionality of the traffic distribution layer.

Figure 8:
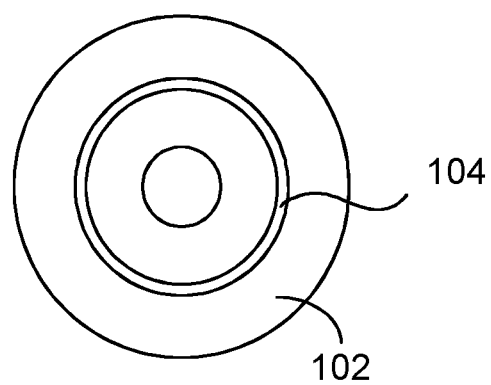
FIG. 8 shows a computer program product comprising a data carrier with computer program code for implementing the stream processing handling arrangement.

The computer program code of a stream processing handling arrangement may also be in the form of computer program for instance on a data carrier, such as a CD ROM disc or a memory stick. In this case the data carrier carries a computer program with the computer program code, which will implement the functionality of the above-described stream processing handling arrangement. One such data carrier 102 with computer program code 104 is schematically shown in FIG. 8.

Furthermore the data handling block libraries may be considered to form means for providing a number of data handling blocks, selectable by a user for forming a work flow, where the data handling blocks comprise data processing blocks representing data processing functions to be included in the work flow.

The work flow creator may be considered to form means for receiving, from the user, selections of data handling blocks comprising data processing blocks, parameter settings of data processing blocks and workflow property objectives.

The frame work recommender may in a similar manner be considered to form means for comparing the workflow property objectives with corresponding stream processing framework capabilities and means for determining a stream processing framework for the work flow based on the comparison, The libraries of software module groups may be considered to form means for providing a number software module groups, where each software module group corresponds to a different stream processing framework and comprises software modules corresponding to the selectable data handling blocks.

The application creator may be considered to form means for choosing a software module group corresponding to the determined stream processing framework, means for selecting, in the chosen software module group, software modules corresponding to the user selected data handling blocks and means for constructing an application performing the activities of the work flow in the determined stream processing framework using the selected software modules.

The work flow creator may further be considered to comprise means for receiving a user selection of an order of the data handling blocks and the application builder may be considered to comprise means for connecting the software modules in the selected order in the application.

The work flow transmitter may be consider to form means for providing data about selected stream processing framework and the user selected data handling blocks and settings in a machine readable file, where the application builder may be further considered to comprise means for extracting the data from the machine readable file in order to choose software module group, select software modules corresponding to the user selected data handling blocks and construct the application.

While the invention has been described in connection with what is presently considered to be most practical and preferred embodiments, it is to be understood that the invention is not to be limited to the disclosed embodiments, but on the contrary, is intended to cover various modifications and equivalent arrangements.

It is for instance possible that some data handling blocks lack corresponding software modules. One reason for this may be that an output of the processing may not be needed in the use case except for alarm generation and/or visualization. Another reason is that if it is needed the location may be a default location of which the user is aware. However, every data processing block has a corresponding software module Therefore the invention is only to be limited by the following claims.

The invention claimed is:

1. A method for allowing a user to obtain an application performing activities of a user selected work flow in a stream processing framework, the method being electronically performed in a stream processing handling arrangement and comprising:
providing a number of data handling blocks, selectable by the user for forming a work flow, the data handling blocks comprising data processing blocks representing data processing functions to be included in the work flow,
receiving, from the user, selections of data handling blocks comprising data processing blocks, parameter settings of data processing blocks, and workflow property objectives,
comparing the workflow property objectives with corresponding stream processing framework capabilities,
determining a stream processing framework for the work flow based on the comparison,
providing a number software module groups, each software module group corresponding to a different stream processing framework and comprising software modules corresponding to the selectable data handling blocks,
choosing a software module group corresponding to the determined stream processing framework,
selecting, in the chosen software module group, software modules corresponding to the user selected data handling blocks, and
constructing an application performing the activities of the work flow in the determined stream processing framework using the selected software modules.

2. The method according to claim 1, further comprising receiving a user selection of an order of the data handling blocks and connecting the software modules in the selected order in the application.

3. The method according to claim 1, wherein the data handling blocks comprise an input block and further comprising receiving, from the user and in relation to the input block, a location from where input data to the workflow is to be obtained.

4. The method according to claim 1, further comprising providing data about the selected stream processing framework, the user selected data handling blocks and their settings in a machine readable file and extracting said data from the machine readable file in order to choose software module group, select software modules corresponding to the user selected data handling blocks and construct the application.

5. The method according to claim 1, wherein the workflow property objectives are related to the prioritizing of workflow properties and a stream processing framework capability is a measure of the ability of a stream processing framework to handle a corresponding property.

6. A stream processing handling arrangement, the stream processing handling arrangement comprising a processor and memory, said memory containing computer instructions executable by said processor to operate said stream processing handling arrangement to:
provide a number of data handling blocks, selectable by a user for forming a work flow, the data handling blocks comprising data processing blocks representing data processing functions to be included in the work flow,
receive, from the user, selections of data handling blocks comprising data processing blocks, parameter settings of data processing blocks and workflow property objectives,
compare the workflow property objectives with corresponding stream processing framework capabilities,
determine a stream processing framework for the work flow based on the comparison,
provide a number software module groups, each software module group corresponding to a different stream processing framework and comprising software modules corresponding to the selectable data handling blocks,
choose a software module group corresponding to the determined stream processing framework, select, in the chosen software module group, software modules corresponding to the user selected data handling blocks, and construct an application performing the activities of the work flow in the determined stream processing framework using the selected software modules.

7. The stream processing handling arrangement according to claim 6, being further operative to receive a user selection of an order of the data handling blocks and connect the software modules in the selected order in the application.

8. The stream processing handling arrangement according to claim 7, being further operative to determine, for each stream processing framework, a compatibility score based on the comparison, and determine the stream processing framework for the work flow based on the compatibility scores.

9. The stream processing handling arrangement according to claim 8, wherein the data processing blocks are part of a software library, wherein the parameter settings correspond to parameters of the data processing blocks, wherein the workflow property objectives include at least one of latency, delay, and/or message loss, and wherein each of the stream processing framework capabilities comprises a measure of the stream processing framework to handle a corresponding workflow property objective including at least one of latency, delay, and/or message loss.

10. The stream processing handling arrangement according to claim 6, wherein the data processing blocks comprise complex event processing blocks.

11. The stream processing handling arrangement according to claim 6, wherein the data processing blocks comprise machine learning blocks.

12. The stream processing handling arrangement according to claim 6, wherein the data handling blocks comprise at least one visualization block for which the user may set a location where a visualization of the processing of the workflow may be presented.

13. The stream processing handling arrangement according to claim 6, wherein the data handling blocks comprise an input block for which the user may set a location from where input data to the workflow is to be obtained.

14. The stream processing handling arrangement according to claim 6, being further operative to provide data about the selected stream processing framework and the user selected data handling blocks and settings in a machine readable file, extract said data from the machine readable file in order to choose software module group, select software modules corresponding to the user selected data handling blocks and construct the application.

15. The stream processing handling arrangement according to claim 6, wherein the workflow property objectives are related to the prioritizing between workflow properties and a stream processing framework capability is a measure of the ability of a stream processing framework to handle a corresponding property.

16. The stream processing handling arrangement according to claim 15, wherein the property is a property in the group of message loss, delay within the work flow and latency.

17. The stream processing handling arrangement according to claim 6, wherein the application is further constructed using a software module specifying a location where the processing of the application is to be performed according to the selected processing framework.

18. The stream processing handling arrangement according to claim 17, being further operative to compile the application at said location.

19. The stream processing handling arrangement according to claim 6, wherein input data for the application comprises physical property data of a node in a mobile network and output data from the application comprises alarms generated based on the input data.

20. A computer program product comprising a non-transitory computer readable storage medium storing computer program code for allowing a user to obtain an application performing activities of a user selected work flow in a stream processing framework, the computer program code which when run by a processor in a stream processing handling arrangement, causes the stream processing handling arrangement to:

provide a number of data handling blocks, selectable by a user for forming a work flow, the data handling blocks comprising data processing blocks representing data processing functions to be included in the work flow, receive, from the user, selections of data handling blocks comprising data processing blocks, parameter settings of data processing blocks and workflow property objectives, compare the workflow property objectives with corresponding stream processing framework capabilities, determine a stream processing framework for the work flow based on the comparison, provide a number software module groups, each software module group corresponding to a different stream processing framework and comprising software modules corresponding to the selectable data handling blocks, choose a software module group corresponding to the determined stream processing framework, select, in the chosen software module group, software modules corresponding to the user selected data handling blocks, and construct an application performing the activities of the work flow in the selected stream processing framework using the selected software modules.

21. The computer program product according to claim 20, the computer program code further operative to cause the stream processing handling arrangement to receive a user selection of an order of the data handling blocks and connect the software modules in the selected order in the application.

* * * * *